United States Patent
Becker et al.

(10) Patent No.: US 6,277,354 B1
(45) Date of Patent: Aug. 21, 2001

(54) PROCESS FOR THE RECOVERY OF CHLORINE FROM IRON CHLORIDES

(75) Inventors: Aaron J. Becker; Stephan C. De La Veaux, both of Wilmington; James B. Dunson, Jr., Newark; Hans Hellmut Glaeser, Wilmington; Suhas Mahuli, Newark, all of DE (US); Gary Ken Whiting, North East, MD (US)

(73) Assignee: E. I. duPont de Nemours and Company, Wilmington, DE (US)

(*) Notice: Subject to any disclaimer, the term of this patent is extended or adjusted under 35 U.S.C. 154(b) by 0 days.

(21) Appl. No.: 09/329,224

(22) Filed: Jun. 10, 1999

(51) Int. Cl.[7] .............................. C01B 7/03; C01G 23/07
(52) U.S. Cl. ..................... 423/613; 423/138; 423/500; 423/614; 423/633
(58) Field of Search ................... 423/500, 613, 423/633, 614, 604, 605, 606, 138, 149

(56) References Cited

U.S. PATENT DOCUMENTS

| | | | |
|---|---|---|---|
| 2,642,339 | 6/1953 | Sawyer ................. | 423/502 |
| 3,092,456 | 6/1963 | Nelson et al. .......... | 423/500 |
| 3,325,252 | 6/1967 | Wikswo et al. ......... | 423/500 |
| 3,464,792 | 9/1969 | Herriman et al. ....... | 423/613 |
| 3,481,703 | 12/1969 | Zirngibl et al. ........ | 423/613 |
| 3,642,442 | 2/1972 | Hoekje et al. ......... | 423/613 |
| 3,793,444 | 2/1974 | Reeves et al. ......... | 423/633 |
| 3,919,400 | 11/1975 | Bonsack ............... | 423/502 |
| 3,925,057 | 12/1975 | Fukushima et al. ...... | 423/148 |
| 4,060,584 * | 11/1977 | Hartmann et al. ....... | 423/149 |
| 4,073,874 | 2/1978 | Fukushima ............ | 423/500 |
| 4,094,954 * | 6/1978 | Bonsack et al. ........ | 423/69 |
| 4,174,381 | 11/1979 | Reeves et al. ......... | 423/502 |
| 4,389,391 * | 6/1983 | Dunn, Jr. ............. | 423/610 |
| 4,576,636 | 3/1986 | Robinson et al. ....... | 423/148 |
| 4,615,874 * | 10/1986 | Olsen et al. .......... | 423/502 |
| 4,624,843 * | 11/1986 | Robinson ............. | 423/493 |
| 4,994,255 | 2/1991 | Hsu ................... | 423/500 |
| 5,207,999 * | 5/1993 | Burk et al. ........... | 423/258 |
| 5,508,015 * | 4/1996 | Gonzalez et al. ....... | 423/613 |

OTHER PUBLICATIONS

Boundary–Layer Theory, McGraw–Hill, New York, 6th Edition (1968), pp. 699–703 (Schlichting).

* cited by examiner

Primary Examiner—Ngoc-Yen Nguyen

(57) ABSTRACT

The present invention provides a process for recovering the chlorine value from a particulate feed stream of metal chlorides wherein the total energy and reactant mass flow are managed to minimize the build up of deposits of solids on the reactor walls and maximize the conversion of the metal chlorides to metal oxides and chlorine.

18 Claims, No Drawings

PROCESS FOR THE RECOVERY OF CHLORINE FROM IRON CHLORIDES

BACKGROUND OF THE INVENTION

The present invention relates to a process for recovering the chlorine value from metal chlorides and the conversion of the metal chlorides to metal oxides.

Many industrial processes that are designed to convert mineral ores to products of greater purity and value involve an initial step wherein metal values in the ore are converted to metal chlorides. The process for the production of titanium dioxide pigment, processes for the production of titanium or zirconium metal are examples of such conversion processes where metal values in the ore are first converted to metal chlorides.

The conversion of ore metal values to metal chlorides provides a means to separate iron and other metal chlorides from those of the higher valued metals, such as those of titanium and zirconium; but there continues to be a need for a process by which the chlorine values from the iron and other metals considered to be of low value may be recovered.

Several processes for the recovery of chlorine have been taught, such as those in U.S. Pat. No. 2,642,339 to Sawyer; U.S. Pat. No. 4,994,255 to Hsu; U.S. Pat. No. 3,793,444 to Reeves et al.; U.S. Pat. No. 4,174,381 to Reeves et al. (all fluidized bed processes); U.S. Pat. No. 3,919,400 to Bonsack (reaction of ferric chloride vapors with sodium chloride and oxidation of the salt complex formed with molecular oxygen); and U.S. Pat. No. 4,576,636 to Robinson et al. (oxidation of ferrous chloride with staged additions of oxygen). The practical application of processes such as these have been limited due to the build-up of deposits, particularly hard scale deposits, on the walls of the process reactor.

Some of the patents listed above address the problem of wall build-up in the reactor. For example, those of Sawyer and Hsu each teach the addition of particles to a fluidized bed reactor to scrub the reactor wall. U.S. Pat. No. 3,092,456 to Nelson and U.S. Pat. No. 3,325,252 to Wikswo et al., each teaches the use of a material to cool the reactor wall.

U.S. Pat. No. 3,464,792 to Herriman et al. teaches introducing a second gas stream (which may be the oxidizing gas, metal halide vapors or a mixture of these) through several injection inlets into a first high-temperature, arc-heated gas stream (that may contain oxygen or a mixture of oxygen, metal halide vapors and an inert gas) in such a way that the second gas stream cools the first gas stream and the reactor walls. According to Herriman et al., there must be a uniform flow of the reactants in this process; and therefore, the injection inlets for the two gas streams must allow equal amounts of gas to pass through them.

U.S. Pat. No. 3,481,703 to Zirngibl teaches the use of an inert gas heated by an electric arc as a means to heat the vapors of the metal chloride and the oxidizing gas to the reaction ignition temperature. This patent teaches flow distributions for the electrode, but does not teach or suggest anything concerning the mass or energy distribution of the reactants.

U.S. Pat. No. 3,642,442 to Hoekje et al. teaches the preparation of pigmentary titanium dioxide using electric-arc-heated oxidizing gas to contact a vapor stream of titanium tetrachloride. Parameters of operation as taught in this patent, may cause the reaction to be limited by the rate of mixing which, particularly in the case of the oxidation of iron chlorides, may result in high levels of deposits on the reactor walls.

U.S. Pat. No. 4,073,874 and U.S. Pat. No. 3,925,057 to Fukushima teach a process for oxidization of ferric chloride vapor. The '874 patent teaches that in the reactor, the velocity of the oxidizing gas, fed at the perimeter of the reactor, and the velocity of central discharge of ferric chloride vapors are selected to be within the range of Reynolds numbers that prevent the ferric chloride vapors from penetrating the surrounding flow of oxidizing gas. Both the '874 and the '057 patents provide processes that are limited by the rate of mixing.

In all of these patents listed above, the reaction zone, that is the zone or space in the reactor where the oxidation reaction takes place, extends to the reactor walls.

An object of the present invention is to provide a process for the oxidation of metal chlorides and recovery of chlorine in which the formation of wall deposits are minimized or controlled.

Another object of the present invention is to allow the direct feed of particles of metal chlorides into the reactor to avoid the need for preheating and/or vaporizing the metal chloride before it enters the reactor.

Another object of the present invention is to provide a process that does not require additional heat to be applied to the reactor beyond that required to initiate the oxidation of the metal chloride.

Another object of the present invention is to provide a process that may be operated as a stand-alone reactor or as a reactor integrated into a process generating metal chloride byproducts. In this integrated installation of the present process, chlorine recovered from the oxidation process may be, for example, recycled into a chlorinator. Solid feed of the metal chlorides, particularly iron rich chlorides, may be fed to the oxidation reactor directly from a separation process following the chlorinator.

Another object of the present invention is to provide a process in which the product oxide particles cool below their sticking point before they reach the reactor walls.

Another object of the present invention is to provide a process in which the bulk temperature is relatively low resulting in higher equilibrium conversions of the metal chloride to chlorine.

SUMMARY OF THE INVENTION

The present invention provides a process for oxidizing a metal chloride with oxygen in a reactor comprising introducing a feed stream containing particles of the metal chloride into a gas-containing jet to form a small, well-mixed reaction zone where at least a portion of the metal chloride feed stream reacts to form a product stream wherein:

(a) the feed stream is introduced into the entrainment zone of the jet;

(b) the heat content of the jet is at least that sufficient to initiate the oxidization of the metal chloride;

(c) the temperature of the feed stream is below a temperature at which the particles of the feed stream become sticky;

(d) the feed stream represents at least one half of the total mass flow of the feed stream and the jet;

(e) the total momentum of the jet is equal or greater than the total momentum of the feed stream; and (f) the diameter of the reaction zone is smaller than the reactor diameter.

In the present process oxygen may be supplied to the reactor via the jet only, via the jet and the feed stream or via the feed stream only. It is preferred that at least a part of the oxygen supplied to the reactor may be oxygen recovered from the product stream.

The present process may be incorporated into a process for the production of titanium dioxide providing an improved process having the steps of reacting a titanium-containing ore in the presence of chlorine and carbon; separation of the byproduct metal chlorides from the titanium tetrachloride; oxidation of the titanium tetrachloride to form a base pigment, the improvement comprising introducing the byproduct metal chlorides as a particulate component of a feed stream into a gas-containing jet to form a small, well-mixed reaction zone where at least a portion of the metal chloride feed stream reacts to form a product stream containing metal oxide and chlorine wherein:

(a) the feed stream is introduced into the entrainment zone of the jet;
(b) the heat content of the jet is at least that sufficient to initiate the oxidization of the metal chloride;
(c) the temperature of the feed stream is below a temperature at which the particles of the feed stream become sticky;
(d) the feed stream represents at least one half of the total mass flow of the feed stream and the jet;
(e) the total momentum of the jet is equal or greater than the total momentum of the feed stream; and
(f) the diameter of the reaction zone is smaller than the reactor diameter.

The jet in the present invention may be a preheated stream, or it may enter the reactor at ambient temperature and be heated by a secondary exothermic reaction taking place in the jet flow. If the jet is heated by a secondary reaction, it is preferred that the secondary chemical reaction is a combustion reaction wherein at least one of the reactants is a component of the jet. If the jet is a preheated stream, it is preferred that the jet is a plasma jet.

In the present process the reactor may operate as an adiabatic reactor or the reactor may be cooled. The reactor may be cooled externally, or it may be cooled internally by the addition of a fluid, particles or a mixture of particles and fluids.

In the present process the jet or the feed stream may contain carbon particles or oxidation products of carbon.

In the present process or the present process incorporated into an improved process for the production of titanium dioxide, the process may be run so that one or more jets entrains one or more feed streams forming one or more reaction zones.

DETAILED DESCRIPTION

The present invention provides a process for oxidizing a particulate metal chloride feed stream with oxygen in a reactor to produce as the reaction products chlorine and metal oxides. This process comprises introducing the feed stream containing particles of the metal chloride into a gas-containing jet to form a small, well-mixed reaction zone. This well-mixed reaction zone results and reactor wall deposits are controlled or eliminated when:

(a) the feed stream is introduced into the entrainment zone of the jet;
(b) the heat content of the jet is at least that sufficient to initiate the oxidization of the metal chloride;
(c) the temperature of the feed stream is below a temperature at which the particles of the feed stream become sticky;
(d) the feed stream represents at least one half of the total mass flow of the feed stream and the jet;
(e) the total momentum of the jet is equal or greater than the total momentum of the feed stream; and
(f) the reaction zone is smaller than the reactor diameter.

Oxygen may be supplied to the reactor through the jet only, through the feed stream only or through both the jet and the feed stream. Unreacted oxygen in the product stream may be separated and fed to the reactor as recycle in the feed stream. It is preferred that the total amount of oxygen fed to the reactor be equal to or greater than that needed to oxidize all the oxidizable material in the feed stream.

As used herein the term entrainment zone means the region of the jet where the surrounding fluid is drawn into the jet by frictional forces. According to the present invention, the feed stream is positioned relative to the jet so that when the feed stream contacts the jet, the feed stream is swept along in the direction of the jet flow. Combined, the jet and the feed stream become a single flow moving in a direction from near the discharge point of the jet to the exit of the reactor.

The feed stream may be positioned relative to the jet in various ways so that it is entrained into the jet. For example, the feed stream may be introduced as a co-axial stream or streams surrounding a central jet, or the feed stream may be introduced as a central stream or streams surrounded by jets.

The inlet or inlets through which the feed stream is delivered to the reactor are located near the nozzle of the jet by which the feed stream is to be entrained. In designing a reactor to be used in the present process, the angle and distance between the location of the jet nozzle and the feed stream inlet may be determined by experiment or by calculation so that for a given geometry and flow rates proper entrainment will be achieved. Generally, there will be some angle between the feed stream and the jet. It is preferred that this angle be from 0 degrees to about 110 degrees.

As used herein the term sticky, when used to refer to the metal chlorides or metal oxide products, means that the ratio of the temperature Kelvin of the particular particles to their melting point temperature Kelvin is equal to or less than about $2/3$.

As used herein the term jet refers to a gas flow delivered to the reactor through a nozzle that is generally smaller in diameter than the pipe feeding into the nozzle. The size difference or diameter difference in the jet nozzle and the pipe result in an increase in the gas flow velocity as it passes through the nozzle into the reactor. The jet may be discharged into the reactor through one or more nozzles in the reactor.

As used herein, the term feed stream means the stream containing the particles of metal chloride to be oxidized. This stream may also include oxygen, air, oxides of carbon, or other gases and particles of carbon, metal oxides, or other solids. In practice of the present invention, the feed stream may be a process stream from a chlorinator such as one for the chlorination of titanium-containing ore. Thus, the feed stream may contain a mixture of a variety of metal chlorides, particles of carbon or coke, metal oxides, silica, and the like.

Oxygen or air separated from the reactor product stream may be recycled into the reactor with the feed stream.

Other types of particles may be fed to the reactor as a part of the feed stream including particles, which alone or in combination with the metal chloride, function as catalysts or otherwise enhance the rate or extent of the oxidation reaction. For example, in the case of the oxidation of iron chloride, such particles include iron oxide or complexes of iron chloride with sodium chloride.

The feed stream may be introduced into the jet from one or from more locations in the reactor. The reactor may also contain one or more jets. These jets in combination with one or more feed streams may produce one or more reaction zones in the reactor.

As used herein the term mass flow means the total mass entering the reactor per unit time. The term mass flow, as used herein, also encompasses the term mass rate, which is used in the fluid dynamic analysis of continuous flow processes. Mass rate is the mass flow divided by time and has units, for example, of kilograms per hour per hour or mass per time squared.

Mass enters the reactor by way of the jet and feed stream. Each of these represents a component of the total mass. That is, during a particular unit of time, usually an hour, the total mass flow to a reaction zone is the sum of the mass of material delivered to the reaction zone by the jet plus the sum of the material delivered to the reaction zone by the feed stream. A reactor, according to the present process may, have one or many reaction zones. For example, one reaction zone may be formed by one or more jets associated with one or more feed streams; or several reaction zones may be formed by sets of associated jets and feed streams.

As used herein the term momentum means the product of the mass times its velocity. As used herein the term momentum also encompasses the term momentum rate, which is used in fluid dynamic analysis of continuous processes. Momentum rate is momentum divided by time and has units, for example, of kilograms meters per second squared.

Both the jet and the feed stream have momentum. The total momentum of each flow, that of the jet and that of the feed stream, includes contributions from both linear and angular components. For example, swirl, an angular motion, may be present in the jet, the feed stream, or both. Swirl contributes to mixing and recirculation of particles in the reaction zone. If the jet is a plasma jet, it is likely that the total momentum of the jet will include some swirl component resulting from the fluctuating magnetic fields applied to the electrodes of the plasma generator to increase electrode life.

The present invention provides a well-mixed, highly turbulent, but tightly bound, reaction zone. The boundaries of this reaction zone may be calculated as described below. The reactor diameter is selected so that the reaction zone is smaller than the reactor diameter. The inventors, in their investigations, have found that it is preferred that the diameter of the reactor be at least twice the diameter of the reaction zone. Although additional reaction may take place outside of this bound reaction zone; the rate of reaction outside of the reaction zone compared to that in the reaction zone is very much slower.

Within this reaction zone the reactants in the feed stream and those in the jet mix and react rapidly resulting in high rates of conversion of the metal chloride to chlorine and the metal oxide.

Characteristic of the present process is its high rates of chloride conversion at short contact times and at relatively low bulk temperatures. For example, in the oxidation of iron chlorides according to the process of the present invention, conversion rates of chlorides to chlorine of 90% or more are achieved at contact times of less than one minute and at bulk temperatures of less than 800° C. The mixing rate in the reaction zone is sufficient that this process, applied to a mixture of iron chlorides, realizes the beneficial effect of the rapid oxidation rate of ferrous chloride.

According the present process, the jet contains sufficient heat content to initiate the oxidation reaction of the metal chloride when mixed with the feed stream. That is, the sum of the heat contents of the jet and the entrained feed stream must be sufficient to initiate the oxidation reaction. The feed stream may be preheated or delivered at ambient or at a temperature lower than ambient. The actual heat content, required to initiate the oxidation reaction, depends on the particular metal chloride or mixture of metal chlorides to be oxidized. The heat content of the jet and of the feed stream may be adjusted, according to the present invention, so that their combined heat content after entrainment is sufficient to initiate the reaction.

The term heat content, when used in referring to the feed stream, means the heat content or enthalpy calculated as the sum of the mass of each component of the feed stream times the specific heat of that component.

The term heat content, when used in referring to the jet, means: (1) the heat content or enthalpy calculated as the sum of the mass of each component of the jet times the specific heat of that component; or (2) the heat that is realized from an exothermic secondary reaction which takes place in the jet after the jet is discharged into the reactor. By secondary reaction is meant an exothermic reaction other than the oxidation of the metal chlorides. The oxidation of the metal chlorides is the primary reactive purpose of the present process and is considered to be the primary exothermic reaction. The terms secondary or primary as used to describe the exothermic reaction do not refer to a time sequence. As can be seen from the information below, the secondary exothermic reaction actually precedes the primary reaction in time although the initiation of the secondary and primary reactions may occur nearly simultaneously.

As noted in the description of heat content in the present invention, the jet may be at ambient temperature, or it may be preheated to some elevated temperature before it is discharged into the reactor.

If the jet is a preheated stream, the gas flow in the jet may be heated externally by a variety of means known in the art including any conventional means such as resistance heaters or heat exchange from the combustion of fuels. It is preferred to heat the jet by a plasma generator. In this case the jet is heated by passing it through an electric arc. The term plasma jet as used herein refers to a jet heated by electric arc. Even though the jet may be preheated using a plasma generator, there is no requirement in the present invention that the jet be a chemical plasma having activated or atomic oxygen present. In fact the present process may be run efficiently when the jet is preheated to temperatures from about 1000 to 5000° C. making it possible to use conventional as well as electric arc heating devices to heat the jet.

If the jet is heated by the exotherm of a secondary chemical reaction that takes place in the jet flow, the jet is discharged into the reactor at a temperature, for example, ambient temperature, that is lower than the temperature needed to initiate the oxidation of the metal chlorides. The secondary reaction is ignited at a point, either before or after, the feed stream is introduced into the jet. The exotherm of the secondary reactions supplies to the jet and the entrained feed stream at least the heat content necessary to initiate the metal chloride oxidation reaction. The point at which the secondary chemical reaction is ignited is determined by fluid mechanics to provide a flame front positioned far enough from the reactor walls to avoid flow disruptions and deposition of material on the reactor walls. Adding an initiator to the jet may ignite the secondary exothermic reaction. For example, pyrophoric carbon particles (an initiator) may be added to the feed stream, or they may be introduced into the jet at a separate feed point.

The controlled-size, but intensely active reaction zone of the present invention results from the precise partitioning of the total reaction zone heat content and total reaction zone momentum into predetermined components delivered to the reaction zone by the jet and the particulate feed stream. This precise partitioning results in a reaction that takes place in a confined space in the reactor. The size (diameter and volume) of this space or reaction zone may be determined from model calculations as shown below.

One might think of the following analysis of the present process as illustrated in Example 1 and compare it to the prior art, particularly U.S. Pat. No. 4,073,874 to Fukushima. In this analysis only two flows are described, a jet and a feed stream, although the analysis may be extended to encompass more than one jet and more than one feed stream as well as more than one reaction zone with in a reactor.

The jet and the feed stream each have mass, which may be represented as a mass flow or a mass rate. One may use mass flows of the feed stream and jet or mass rates of the feed stream and jet since, according to the present invention, it is the comparison of either the mass flows or mass rates between the feed stream and the jet that is important.

In Example 1 the jet is a flow of 100% by weight oxygen discharged to the reactor at the rate of 74 pounds per hour at one atmosphere of pressure and 20° C.

The mass flow of the feed stream in the Example is the total of the particles and an oxygen flow. Thus, the total mass flow of the feed stream is the sum of the mass flow of the particles and the gas (also fed at 1 atmosphere and 20° C.) and is equal to 695 pounds per hour.

The total reactor mass flow per hour partitioned to the feed stream and the jet is represented by the ratio of these two flows: 695 divided by 74 or 9.4 to 1. If one had used the comparison of mass rates, the ratio would be the same.

The present invention requires that the ratio of the mass flow or mass rate of the feed stream compared to that of the jet be at least 1 to 1. This is expressed in the claims as the "feed stream represents at least one half of the total mass flow of the feed stream and jet".

The jet and the feed stream each have kinetic properties from the very fact they are moving into and flowing through the reactor. The kinetic property of each of these flows may be represented by the momentum or by the momentum rate.

In the Example, the velocity of the jet is 850 m/s, while that of the feed stream is 20 m/s. In SI units, the momentum rate of each flow is 7.9 kgm/s$^2$ for the jet and 1.73 kgm/s$^2$ for the feed stream. The partitioning of the total reactor momentum rate is represented by the ratio of the momentum rate of the jet to that of the feed stream: 7.9 divided by 1.73 or about 5 to 1. If one had used the comparison of momentums, the ratio would be the same.

The present invention requires that the ratio of the momentum or momentum rate of the jet compared to that of the feed stream be at least 1 to 1. This is expressed in the claims as the "the total momentum of the jet is equal to or greater than that of the feed stream".

In the Example, even though the feed stream contains the greater mass, its lower speed means that the feed stream has a much lower momentum than the jet. When the dense and slow feed stream is introduced into the jet's entrainment zone, the jet and the feed stream become essentially a single flow moving from the reactor entrance to the reactor exit. By combining the high-momentum jet with the high-mass, low-momentum feed, the jet rapidly is slowed down. Such a rapid slow down decreases the velocity component of particles directed towards the reactor walls. It is believed that in the present invention, the velocity of the sticky metal oxide product particles is slowed so much that they cool well below their sticking point before they can reach the reactor walls. This effect essentially eliminates the build-up of hard scale reactor wall deposits.

Examples 1 and 2, below, illustrate one mode of the present invention; however, the well-mixed reaction zone of the present invention results when:
(1) the feed stream represents at least one half of the total mass flow of the feed stream and the jet; and
(2) the momentum of the jet is equal or greater than that of the feed stream.

In U.S. Pat. No. 4,073,874 to Fukushima, the velocities of both the oxygen and ferric chloride gas streams taught are to be low as shown by the Reynolds Numbers. In Fukushima, the range of Reynolds Numbers for the ferric chloride gas is taught to be from 2.1 to 8.9, each ×10$^4$. This teaching combined with the teaching that the range of the ratios between the velocities of the oxidizing gas and that of the ferric chloride are from 0.1 to 6 means that the momentum of the two streams is nearly equal, but Fukushima makes no teaching or suggestion as to the partitioning of the total reactor mass flow into the oxidizing or the ferric chloride streams. Nor does Fukushima teach that the one stream must be entrained by the other. Fukushima teaches impinging jets, but neither teaches nor suggests entrainment.

The invention of the '874 patent is also limited to a range of Reynolds numbers. As one can see from the above, the present invention is not performance limited in any practical way to a narrow range of Reynolds Numbers. This means the process of the present invention may be more easily scaled than that of the prior art.

In the present process the thermal properties or heat contents of the jet and the feed stream are also important. Sufficient heat content is required to initiate the oxidation reaction.

The present process requires:
(1) the heat content of the hot jet is at least that sufficient to initiate the reaction when the hot jet is mixed with the feed stream; and
(2) the temperature of the feed stream is below a temperature at which the particles of the feed stream become sticky.

This partitioning of total heat content delivered to the reactor between the jet and the feed stream, according to the present invention, results in an overall relatively low temperature process. The inventors believe the reaction rate in the present process to be much less rate limited by mixing than prior art inventions. No additional heat is required to accelerate the reaction; thus, there is no loss in the rate of conversion due to unfavorable equilibrium conditions. For example, the bulk temperature of the present process as illustrated in the Examples operates at a much lower average bulk temperature than the earlier known processes. Lower bulk temperatures result in higher equilibrium conversion rates as well as in a more energy efficient operation. The present process may be operated as an adiabatic process. A reactor operating with the present process does not require heating or cooling of the walls to prevent the deposition of wall scale.

Although wall heating or cooling is not critical, if desired the present process may incorporate reactor wall heating or cooling. Cooling may be accomplished by externally cooling the reactor walls, for example by allowing free heat losses or using a jacketed reactor. The reactor may be cooled internally by the addition of a fluid, particles or a mixture of particles and fluids, added at a point far enough from the reaction zone such that the reaction zone is not expanded to reach the reactor wall.

Generally in the practice of the present invention, the feed stream will consist of particles of the metal chloride mixed with a gas that provides some velocity greater than that of free fall or propels the particles as they exit the feed discharge point. When the feed stream contains the particles with a propellant gas, the mass of the feed stream is the total mass of the particles plus the propellant. In the case of continuous operation of the present process, unreacted oxygen present in the product stream may be recycled to the reaction zone by way of the feed stream to function both as a reactant and a propellant.

The solid particles of the feed stream may be discharged into the reactor at room temperature or at some elevated temperature so long as the particles may be fed as solids. For example, using the present process for the oxidation of iron chlorides, it is preferred to feed ferrous chloride at a temperature less than 400° C.

In the present process entrainment of the jet and the feed stream forms a well mixed, but tightly bound reaction zone. For example, based on the mass and momentum rates and the configuration of the reactor in Example 1, the reaction zone has a diameter of about 14 cm. In this reaction zone, particles (reactant or product) have velocities of about 1000 m/s. The large difference in the densities of the hot jet and the feed stream in this Example, result in the rapid deceleration of the entrained flows; so that at a distance of less than about 30 cm from the point of entrainment, the particles have velocity components directed towards the wall of the reactor of less than 5 m/s.

In the present process, the jet may be an inert gas (one that does not react under the conditions in the reactor) or an inert gas mixed with oxygen, or a jet containing 100 percent by weight oxygen. It is preferred that the jet contain at least some percentage of oxygen since this promotes the reaction rate by avoiding dilution of the reactant streams in the reaction zone. It is more preferred that the jet be 100% by weight oxygen.

The total amount of oxygen supplied to the reactor by way of the jet and the feed stream is preferred to be at least the stoichiometric amount needed to oxidize the oxidizable materials in the feed stream. Typically the total oxygen supplied to the reactor is more than the stoichiometric amount.

Those skilled in this art will appreciate that the present invention may be applicable to a wide variety of metal chlorides, including most, if not all, transition metal chlorides. The present process may be applied to mixtures of metal chlorides as well as to individual metal chloride compounds. For example, iron chlorides as ferric, ferrous or as mixtures of ferric and ferrous chloride may be oxidized by the present process resulting in high rates of conversions of these compounds to chlorine and iron oxide. In the present process the technique to recover the product metal oxides and chlorine is not critical. Product recovery may be achieved by methods known in the art.

METHOD FOR CALCULATING OF THE DIAMETER OF THE REACTION ZONE

In the materials cited, the term mixing zone has the same meaning as the reaction zone of the present invention.

Calculation of the reaction zone diameter is based on the teachings of Schlichting, *Boundary-Layer Theory*, McGraw-Hill, New York, 6$^{th}$ Edition (1968), pages 699–703, (Schlichting). Schlichting teaches a semi-empirical model of circular jets. His theory is based on kinematic momentum rates, which by definition do not include units of mass.

Although the jet in the present invention is not limited to a circular jet, the Schlichting theory may be used to calculate the diameter of the reaction zone, particularly when applied to the Examples.

From Schlichting, generally the kinematic momentum rate (K) is defined as the definite integral from 0 to infinity:

$$K = 2\pi \int V^2 r\, dr$$

For the present invention the integration of the above equation is from 0 to r, the radius of the jet nozzle, and the equation reduces to:

$$K = AV^2,$$

where A is the area of the nozzle, and V is the velocity of the jet at the nozzle. In addition, the effective volume rates of the jet and feed stream are calculated, in all cases adjusting for a common temperature. The volume rate is the volume of the gas plus particles associated with the mass rate. The common temperature is the temperature calculated for the single, combined flow of the jet plus the feed stream. The term common temperature is used because it emphasizes that when the feed stream is entrained into the jet, the combination becomes one common flow. The common temperature is calculated from (1) the initial temperatures of each flow and (2) the total mass and the specific heats of each component of each flow with (3) compensation for the exotherm of the oxidation reaction. The extent of the exotherm and the compensation factor (3) is determined from a comparison of the measured bulk temperature of the reactor to that of the uncompensated temperature calculated using only (1) and (2) above.

In the present invention, the jet and the feed stream are positioned so that the jet entrains the feed stream. From Schlichting, the volume rate (Q) of the feed stream entrained into the jet is given by the product $$Q = 0.404 X K,$$

where X is the distance downstream of the nozzle and the constant 0.404 is from Schlichting equation 24.47. Using this equation, one may then calculate at what distance X, all (about 95% or more) of the volume rate of the feed stream is entrained into the jet. For Example 1, this distance, X is 0.33 meters. The half-width of the entrained jet is roughly 0.21 times X, or 7 centimeters. The constant 0.21 is arrived at as 2.5 times 0.0848. These constants are again taken from Schlichting at figure 24.8 (with note by H. Reichardt).

The total width of the jet and entrained flow, which is equal to the diameter of the reaction zone, is two times the half width, or 14 centimeters. Thus, the diameter of the reaction zone is the calculated diameter of the combined jet and feed stream flows at the distance X where the feed stream is entrained, and the feed and jet become a single, slow-moving flow.

The following Examples are intended to illustrate the operation of the present invention. These Examples are intended to illustrate, but not to limit the invention.

EXAMPLES

Example 1

A mixture of metal chlorides containing iron chlorides was oxidized according to the present invention in a continuous process to produce a mixture of metal oxides and chlorine. The oxidation reaction was carried out in a reactor that was 18 inches (45.7 cm) in diameter and 10 feet long.

The jet was formed from nearly pure oxygen by feeding the oxygen at room temperature and at a mass flow rate of 74 pounds per hour and a pressure of one atmosphere to a Westinghouse plasma generator with a nominal rating of 150 kW. The oxygen was heated by an electric discharge as it flowed between the anode and cathode of the generator. The varying magnetic field applied to the generator electrodes caused the oxygen flow to rotate providing some swirl.

The generator heated the oxygen flow such that its heat content was 7200 J/liter of oxygen at STP, and its calculated temperature was in the range of 4000–4500° C.

The heated oxygen was then fed through a nozzle having a diameter of 1.43 cm to the reactor to form a jet. The momentum of the jet was 7.9 kgm/sec$^2$ and as the oxygen passed through the nozzle into the reactor its velocity was 850 m/s. The direction of the jet's flow was from the top of the reactor vertically down the length of the reactor.

The reactor was preheated using nitrogen to a calculated temperature of about 800° C. for an hour prior to introducing feed stream of metal chloride particles.

The feed stream was a mixture of particles and gas produced as byproduct in the chlorination of titanium-containing ore. Particles present in the feed stream included the iron and other metal chlorides, coke, silica and other metal oxides. Iron chlorides represented 44% of the particle weight of the feed stream. In the iron chlorides, ferrous chloride represented the major component.

Total oxygen content of the jet plus the oxygen fed through the feed stream was 455% of that required to fully oxidize the iron chlorides. The particles, supplied as solids through a screw feeder at a mass flow rate of 499 pounds per hour, were mixed, at room temperature, with a stream of nearly pure oxygen in an eductor to produce the feed stream. The oxygen was fed at room temperature at a mass flow rate of 196 pounds per hour. The total mass flow rate of the feed stream, the sum of the particles and the oxygen feeds was 695 pounds per hour. The velocity of the feed stream was 20 m/hr, and its momentum was 1.73 kgm/sec$^2$.

The feed stream was fed into the reactor through a single annular port positioned at approximately a 0° angle to the jet and separated form the jet by 5 cm.

An average mix temperature of 575° C. was calculated from the temperatures and flow rates of the jet and the feed stream. This temperature is exclusive of the exotherm produced by the oxidation reaction. The reaction exotherm combined with the heat energy already present in the combined jet and feed stream produced an average adiabatic reactor temperature of about 750° C.

The residence time for the reactants in the reactor was about 7 seconds. Actual contact time or the residence time in the reaction zone was much less.

The product stream was cooled and solids were separated from the reactor exit gas. Chlorine conversion from the metal chlorides was greater than 90%. This very high chlorine conversion in such a short period of time shows that the reaction of present process is not limited by mixing as those of the prior art.

After 1.5 hours operation, the reaction was stopped, the reactor allowed to cool and was opened for inspection. There was only a thin powdery coating of iron oxide approximately 0.3 cm thick on the reactor walls. There was no hard scale formation on the reactor walls. Some product iron oxide, again a soft powder, collected in the bottom of the reactor.

Examination of the mass, momentum and heat content distributions in the jet and the feed stream show that about 90% of the total mass flow in the reactor was contributed by the feed stream (100×695/(695+74)). The jet represented approximately 82% of the total momentum (100×7.9/(7.9+1.73)). The calculated reaction zone diameter was 14 cm.

Example 2

The process of Example 1 was repeated with the following differences. The oxygen to the generator was at a mass flow rate of 60 pounds per hour. Heat content of the gas-containing jet was 7150 J/l. The momentum of the jet was 5.15 kgm/sec$^2$.

The iron chloride represented 50% by weight of the particles fed with ferrous chloride being the major component of the iron chlorides. Again, the feed stream contained particles similar to that of Example 1 and was fed at a mass flow rate of 598 pounds per hour. Nearly pure oxygen was mixed with the particles at a mass flow rate of 94 pounds per hour. The total mass flow rate of the feed stream was 692 pounds per hour. The momentum of the feed stream was 0.70 kgm/sec$^2$.

Total oxygen content of the jet plus the oxygen fed through the feed stream was 270% of that required to fully oxidize the iron chlorides. The calculated average temperature in the reactor after the mixing of the feed stream and the jet was 580° C. The residence time in the reactor was about 9 seconds. Chlorine conversion was greater than 90%.

After 2 hours operation, the reaction was stopped, the reactor allowed to cool, and the reactor was opened for inspection. As in Example 1, there was only a thin powdery coating of iron oxide approximately 0.3 cm thick on the reactor walls. There was no hard scale formation on the reactor walls. Some product iron oxide, again a soft powder, collected in the bottom of the reactor.

Examination of the mass, momentum and heat content distributions in the jet and the feed stream were as follows: About 92% (100×692/(692+60)) of the mass flow in the reactor was contributed by the feed stream. The jet represented approximately 88% of the total momentum (100× 5.15/(5.15+0.7)). The calculated reaction zone diameter was 14 cm.

Comparative Example

The following example illustrates the operation of a reaction system that is outside the claims of the present invention.

Prior to start-up, the reactor, 2 inch in diameter and mounted horizontally, was preheated by passing a stream of nearly pure oxygen which was heated by resistance heating through the reactor. The temperature of oxygen was controlled at about 980° C. and was fed to the reactor at a mass flow rate of 200 pounds per hour through a converging/diverging nozzle to form the jet. The heat content of the jet was 1600 J/l. The momentum of the jet oxygen was 19.2 kgm/sec$^2$.

Nearly all the oxygen gas delivered to the reactor was delivered via the jet. The total oxygen content delivered to the reactor was 970% of that required to fully oxidize the metal chlorides.

The particles of the feed stream were a mixture of metal chlorides produced as metal chloride byproduct in the chlorination titanium-containing ore and similar to those of Examples 1 and 2. The metal chloride particles were introduced to the reactor at room temperature, at a mass flow rate of 112 pounds per hour. The feed stream also contained silica sand scrubs, which were metered separately from the metal chloride particles and mixed with the metal chloride particle feed prior to introduction into the reactor.

The total mass flow of the feed stream was about 200 pounds per hour. The feed stream was gravity fed into the reactor via a port located above the jet and at about a 90° angle to the jet flow. A partial vacuum, induced by the entrainment of the feed stream into the flow from the oxygen nozzle, drew the feed stream into the reactor. The momentum of the feed stream, was nearly 0 kgm/sec$^2$ and approximately two orders of magnitude less than that of the jet because the net axial velocity of the feed stream is nearly 0 m/s.

The calculated average temperature in the reactor after the mixing of the feed stream and the jet was 640° C.

Under these conditions, the reaction zone extended to the reactor walls. Particles of feed and product metal oxide were directed towards the rector walls at high velocities. On contact, these particles cooled forming hard deposits. The addition of scrub solids did not prevent wall deposits.

The residence time in the reactor was about 0.21 seconds. Analysis of the products showed that the initial chlorine conversion rate was 76%; the rate dropped to about 40% after one hour into the run.

The run was terminated after 1 hour and 7 minutes of operation, and the reactor was opened for inspection. A solid donut-shaped formation of solids was observed about 3 inches downstream from the point at which the metal chlorides were introduced to the reactor. This formation reduced the interior diameter of the reactor from 2" to about 1.7". Buildup was also found around the oxygen nozzle tip, extending the tip about ¼" into the reactor. Indications were that with continued operation of this system, the reactor would have plugged.

Comparing the distribution of momentum and heat content of the jet and feed stream in this comparative example show that nearly all the momentum in this system was in the jet although the mass flow distribution between the jet and the feed stream was nearly equal. The calculated diameter of reaction zone was equivalent to the reactor diameter. When the reactor diameter and the reaction zone diameter are equivalent particles accelerate to the walls and on contacting the walls form deposits of scale. In this case the wall deposits were so strongly attached that they continued to build up and restrict the flow through the reactor. These deposits also altered the heat balance so much that the rate of reaction was reduced with time.

What is claimed is:

1. A process for oxidizing a metal chloride with oxygen in a reactor comprising introducing a feed stream containing particles of the metal chloride into a gas-containing jet to form a small, well-mixed reaction zone where at least a portion of the metal chloride feed stream reacts to form a product stream wherein:
   (a) the feed stream is introduced into the entrainment zone of the jet;
   (b) the heat content of the jet is at least sufficient to initiate the oxidization of the metal chloride;
   (c) the temperature of the feed stream is below a temperature at which the particles of the feed stream become sticky;
   (d) the feed stream represents at least one half of the total mass flow of the feed stream and the jet;
   (e) the total momentum of the jet is equal or greater than the total momentum of the feed stream;
   (f) the diameter of the reaction zone is smaller than the reactor diameter;
   (g) the oxygen is supplied to the reactor through the jet only, through the feed stream only or through both the jet and the feed stream.

2. The process of claim 1 wherein all the oxygen is supplied to the reactor through the jet.

3. The process of claim 1 wherein the jet contains an inert gas.

4. The process of claim 1 wherein at least a part of the oxygen is supplied to the reactor as unreacted oxygen recovered from the product stream.

5. The process of claim 1 wherein the jet is a preheated stream.

6. The process of claim 5 wherein the jet is a plasma.

7. The process of claim 1 wherein the heat content of the jet is provided by a secondary exothermic reaction taking place in the jet flow.

8. The process of claim 7 wherein the secondary chemical reaction is a combustion reaction wherein at least one of the reactants is a component of the jet.

9. The process of claim 1 wherein the reactor is adiabatic.

10. The process of claim 1 wherein the reactor is cooled externally.

11. The process of claim 1 wherein the jet or the feed stream contain carbon particles or oxidation products of carbon.

12. The process of claim 1 or 3 wherein the jet is 100% by weight oxygen or a mixture of oxygen with an inert gas.

13. The process of claim 1 wherein the oxygen supplied to the reactor is supplied in an amount equal to or greater than that required to stoichiometrically oxidize metal chlorides in the feed stream.

14. The process of claim 1 wherein a component of the total momentum of the jet or the feed stream or both is swirl.

15. The process of claim 1 wherein the reactor is cooled internally by the addition of a fluid, particles or a mixture of particles and fluids.

16. In a process for the production of titanium dioxide pigment having the steps of reacting a titanium dioxide containing ore in the presence of chlorine and carbon; separation of the byproduct metal chlorides from the titanium tetrachloride; oxidation of the titanium tetrachloride to form a base pigment, the improvement comprising introducing the byproduct metal chlorides as a particulate component of a feed stream into a gas-containing jet to form a small, well-mixed reaction zone in a reactor where at least a portion of the metal chloride feed stream reacts to form a product stream containing metal oxide and chlorine wherein:
   (a) the feed stream is introduced into the entrainment zone of the jet;
   (b) the heat content of the jet is at least sufficient to initiate the oxidization of the metal chloride;
   (c) the temperature of the feed stream is below a temperature at which the particles of the feed stream become sticky;
   (d) the feed stream represents at least one half of the total mass flow of the feed stream and the jet;
   (e) the total momentum of the jet is equal or greater than the total momentum of the feed stream;
   (f) the diameter of the reaction zone is smaller than the reactor diameter;
   (g) the oxygen is supplied to the reactor through the jet only, through the feed stream only or through both the jet and the feed stream.

17. The process of claims 1 or 16 wherein the diameter of the reactor is at least two times that of the reaction zone.

18. The process of claims 1 or 16 wherein the angle between the feed stream and the jet is between 0 and about 110 degrees.

* * * * *